United States Patent
Knepple et al.

(10) Patent No.: US 9,718,319 B2
(45) Date of Patent: Aug. 1, 2017

(54) PRESSURE AND TEMPERATURE COMPENSATED CONTROL VALVE ASSEMBLY

(71) Applicant: Parker-Hannifin Corporation, Cleveland, OH (US)

(72) Inventors: Robert B. Knepple, Kalamazoo, MI (US); James Beverly, Kalamazoo, MI (US); Leonard Jabcon, Kalamazoo, MI (US)

(73) Assignee: Parker Hannifin Corporation, Cleveland, OH (US)

( * ) Notice: Subject to any disclaimer, the term of this patent is extended or adjusted under 35 U.S.C. 154(b) by 73 days.

(21) Appl. No.: 14/896,508

(22) PCT Filed: Jul. 9, 2014

(86) PCT No.: PCT/US2014/045976
§ 371 (c)(1),
(2) Date: Dec. 7, 2015

(87) PCT Pub. No.: WO2015/006462
PCT Pub. Date: Jan. 15, 2015

(65) Prior Publication Data
US 2016/0144675 A1 May 26, 2016

Related U.S. Application Data

(60) Provisional application No. 61/869,398, filed on Aug. 23, 2013, provisional application No. 61/863,460, (Continued)

(51) Int. Cl.
*F16K 15/20* (2006.01)
*B60C 29/00* (2006.01)
*B60C 23/00* (2006.01)

(52) U.S. Cl.
CPC .......... *B60C 29/002* (2013.01); *B60C 23/001* (2013.01); *B60C 23/003* (2013.01); (Continued)

(58) Field of Classification Search
CPC ............. B60C 23/003; Y10T 137/2544; Y10T 137/3631; Y10T 137/3646
See application file for complete search history.

(56) References Cited

U.S. PATENT DOCUMENTS 1,814,207 A * 7/1931 Donkin ................... B60S 5/043
137/224
4,782,879 A 11/1988 Le Chatelier et al.
(Continued)

FOREIGN PATENT DOCUMENTS

| DE | 33 17 810 A1 | 11/1984 |
|---|---|---|
| EP | 0 359 424 A2 | 3/1990 |
| EP | 0 511 135 A1 | 10/1992 |
| EP | 1 031 899 A2 | 8/2000 |
| FR | 1563179 | 3/1969 |

OTHER PUBLICATIONS

International Search Report for corresponding Patent Application No. PCT/IUS2014/045976 dated Sep. 24, 2014.

*Primary Examiner* — R. K. Arundale
(74) *Attorney, Agent, or Firm* — Renner, Otto, Boisselle & Sklar, LLP (57) ABSTRACT

A pressure and temperature compensated valve assembly includes a flow valve allowing inflation flow from a control port to a tire port and controlling deflation flow from the tire port to the control port. A throttle valve restricts deflation flow between the tire port and the control port when deflating the tire at high flow rates or when tire pressure is high, thus enabling the flow valve to be closed. The throttle valve includes a throttle diaphragm that throttles in response to flow from the tire port and which does not restrict inflation flow from the control port. The valve assembly further includes a temperature responsive member engaging the (Continued)

flow valve, and which deforms in response to a change in temperature in the valve assembly, thus negating temperature effects on the flow valve, allowing the flow valve to close at a consistent force across a range of operating temperatures.

20 Claims, 8 Drawing Sheets

Related U.S. Application Data filed on Aug. 8, 2013, provisional application No. 61/843,942, filed on Jul. 9, 2013.

(52) U.S. Cl.
CPC ....... *F16K 15/207* (2013.01); *Y10T 137/2544* (2015.04); *Y10T 137/3646* (2015.04)

(56) References Cited

U.S. PATENT DOCUMENTS

| | | | | |
|---|---|---|---|---|
| 4,877,048 A | * | 10/1989 | Oltean | B60C 23/003 137/225 |
| 4,883,105 A | * | 11/1989 | Schultz | B60C 23/003 137/859 |
| 4,893,664 A | * | 1/1990 | Oltean | B60C 23/003 137/859 |
| 4,922,946 A | | 5/1990 | Boulicault | |
| 5,273,064 A | | 12/1993 | Beverly et al. | |
| 5,540,268 A | | 7/1996 | Mittal | |
| 6,098,682 A | | 8/2000 | Kis | |
| 6,250,327 B1 | | 6/2001 | Freigang et al. | |
| 7,089,953 B2 | | 8/2006 | Beau | |
| 2004/0103939 A1 | * | 6/2004 | Beau | B60C 23/003 137/225 |

* cited by examiner

PRESSURE AND TEMPERATURE COMPENSATED CONTROL VALVE ASSEMBLY

RELATED APPLICATION DATA

This application is a national phase of International Application No. PCT/US2014/045976 filed on Jul. 9, 2014 and published in the English language, which claims priority to U.S. Provisional No. 61/843,942 filed Jul. 9, 2013, U.S. Provisional Application No. 61/863,460 filed Aug. 8, 2013, and U.S. Provisional Application No. 61/869,398 filed Aug. 23, 2013, each of which are herein incorporated by reference.

FIELD OF INVENTION

The present disclosure relates generally to valves, and more particularly to a pressure and temperature compensated control valve assembly of the type used in central tire inflation systems for controlling the deflation and inflation of a tire.

BACKGROUND

A central tire inflation system (CTIS) provides mobility enhancement through tire pressure adjustment and maintenance for on/off highway, commercial, non-commercial and tactical wheeled vehicles. An ideal CTIS provides fast inflation and deflation rates, enabling a vehicle to efficiently traverse surfaces having different hardness. For example, tires may be deflated, providing a larger wheel surface area for traversing relatively soft ground. System components are ideally closed from external environments to achieve long air seal life through reduction in moisture and contaminants and through enabling de-pressurization of seals when not actively adjusting tire pressures.

A typical CTIS includes a control interface providing manual and/or automatic adjustment of tire pressures. The control interface is communicatively connected to a compressor for providing air to the tires, and to a pneumatic control unit. The pneumatic control unit is responsive to the control interface and is communicatively connected between the compressor and a system of air transfer passages connected to and/or formed within the vehicle, such as in the frame and wheels. Rotary unions often communicatively connect the air transfer passages in the wheel to the air transfer passages in the remainder of the vehicle. A CTIS often also includes a wheel valve assembly, such as a wheel control valve assembly, disposed at each wheel to provide control of deflation and inflation of the respective tire.

Deflation rates are typically set by the primary controlling orifice in the wheel valve assembly. Faster deflation rates demand a larger cross-sectional flow area, such as at lower desired tire pressures where deflation rates are most affected. Closing forces required to seal against the control orifice of the wheel valve assembly increase with respect to increases in the effective area that the tire pressure works upon and/or with respect to increases in the desired maximum operating tire pressure. The closing force must be sufficient to overcome the desired maximum operating tire pressure, maintaining closure of the valve, while also being sufficient to react against resulting back pressure in the system, such as in the air transfer passages, due to the inherent downstream restriction of air flow through the lines and fittings of the air transfer passages, thus enabling the valve assembly to close. The minimum obtainable tire pressure control is therefore impacted by the maximum required closing force resulting from these variables.

Wheel valve assembly performance is also impacted by the effects of temperature and durability of components of the wheel valve assembly. Trapped volumes within the wheel valve assembly are subjected to the varying pressures due to varying operating temperatures of the wheel valve assembly. Closing forces must be capable of overcoming changes in pressure in these volumes. The wheel valve assembly must therefore be able to compensate for the high closing forces required at maximum desired inflation pressures and low temperatures, and remain open in order to deflate to the minimum desired inflation pressures at high temperatures at the desired deflation rate.

SUMMARY OF INVENTION

One aspect of the present disclosure provides a control valve assembly including a valve body having a control port and a tire port, the valve body defining a flow chamber and a regulation chamber disposed between the control port and the tire port. The control valve assembly also includes a flow valve disposed in the flow chamber to control flow between the flow chamber and the regulation chamber, the flow valve being biased in a flow closed position and movable between the flow closed position and a flow open position in response to pressure in the flow chamber. The control valve assembly further includes a throttle valve disposed in the regulation chamber to restrict flow from the regulation chamber to the flow chamber, the throttle valve including a throttle valve seat and a throttle diaphragm for moving with respect to the throttle valve seat. The throttle valve is movable between a throttle open position of the throttle valve, where the throttle diaphragm is spaced a distance from the throttle valve seat and a throttle throttling position of the throttle valve, where the throttle diaphragm is spaced nearer the throttle valve seat than in the throttle open position. The throttle diaphragm has opposite sides each in communication with pressure in the regulation chamber, and flow through the regulation chamber effects a pressure differential across the throttle diaphragm causing the throttle diaphragm to move between the throttle open and throttle throttling positions.

The opposite sides of throttle diaphragm may include a first side positioned in the path of flow from the tire port and a second side positioned in the path of flow from the flow chamber.

The throttle diaphragm may be disengaged from any biasing member in both the throttle open and throttle throttling positions of the throttle valve.

Absent flow through the regulation chamber, the throttle diaphragm may be normally in the throttle open position via equal pressures acting on opposite sides of the throttle diaphragm.

The throttle diaphragm may be made of a metallic material.

The throttle valve seat may be adjustably positionable with respect to the throttle diaphragm, thereby setting the flow rate at which the throttle valve throttles.

The throttle diaphragm may be radially inwardly spaced from the valve body, thereby allowing flow through the regulation chamber to flow about all sides of the throttle diaphragm.

The valve body may further define a biasing member chamber, and the control valve assembly may further include a temperature responsive member disposed in the biasing member chamber and engaging the flow valve, the temperature responsive member being deformable in response to change in temperature to counter a pressure affecting the flow valve, the pressure being caused by the change in temperature.

The flow valve may include a flow diaphragm for controlling flow through the flow valve.

The flow diaphragm may be made of a metallic material.

The control valve assembly may further include an orifice extending between the flow chamber and the regulation chamber, wherein a first side of the orifice is engageable by the flow valve to open and close the flow valve, and wherein a second side of the orifice is disposed adjacent the throttle diaphragm to restrict flow from the regulation chamber to the flow chamber as the throttle diaphragm moves with respect to the second side of the orifice.

The throttle valve may further include a throttle valve housing at least partially enclosing the throttle diaphragm, wherein the throttle valve housing includes at least one aperture formed through the throttle valve housing, the at least one aperture extending between a first side open to the orifice and a second side open to the tire port, and wherein the at least one aperture has an effective area less than the orifice extending between the flow chamber and the regulation chamber.

The temperature responsive member may include an aperture extending between opposite sides of the temperature responsive member, thereby allowing pressure equalization across the temperature responsive member.

The temperature responsive member may be deformable towards the flow valve in response to relatively cold temperatures, and wherein the temperature responsive member is deformable away from the flow valve in response to relatively hot temperatures.

The temperature responsive member may be separated from flow between the control port and the tire port.

Another aspect of the present disclosure provides a control valve assembly including a valve body including a control port and a tire port. The control valve assembly further includes a flow valve disposed in the valve body for controlling flow between the control port and the tire port, the flow valve including a valve member and a biasing member for biasing the valve member in a closed position. A throttle valve is disposed in the valve body for restricting flow through the flow valve. A transition orifice is disposed in the valve body between the flow valve and the throttle valve, a first side of the transition orifice being engageable by the flow valve, and a second side of the orifice being disposed adjacent the throttle valve. A temperature responsive member is disposed in the valve body and engages the biasing member, the temperature responsive member being deformable in response to change in temperature to vary a pressure acting on the flow valve, the pressure being caused by the change in temperature.

The temperature responsive member may include an aperture extending between opposite sides of the temperature responsive member, thereby allowing pressure equalization across the temperature responsive member.

The temperature responsive member may be deformable towards the biasing member in response to relatively cold temperatures, and wherein the temperature responsive member is deformable away from the biasing member in response to relatively hot temperatures.

The temperature responsive member may be separated from flow between the control port and the tire port.

According to yet another aspect of the present disclosure, a method of adjusting tire pressure of a tire is provided. The method includes the steps of controlling inflation and deflation flow between a source and the tire via a flow valve, restricting deflation flow between the source and the tire via a throttle valve, and moving air about opposite sides of a throttle diaphragm of the throttle valve to throttle the throttle valve, wherein the throttle diaphragm is separated from contact with any biasing member.

The method may further include the step of adjusting a force of a biasing member acting on the flow valve via deformation of a temperature responsive member engaging the biasing member.

Restricting deflation flow between the source and the tire may include throttling the throttle valve in response to increased flow from the direction of the tire, thereby enabling the flow valve to close.

The method may further include the step of adjustably positioning a throttle valve seat of the throttle valve with respect to the throttle diaphragm of the throttle valve, thereby setting the flow rate at which the throttle valve throttles.

The foregoing and other features are hereinafter described in greater detail with reference to the accompanying drawings.

DETAILED DESCRIPTION

The principles of the present disclosure have particular application to central tire inflation systems (CTISs) for quickly adjusting the tire pressure of tires of wheeled vehicles, such as commercial trucks, off-road vehicles, tactical wheeled vehicles, etc. Of course, the principles of the present disclosure may be useful in other applications requiring quick inflation and/or deflation of an inflatable member or body, or even in applications requiring the use of a control valve assembly including a throttle valve.

Figure 1:
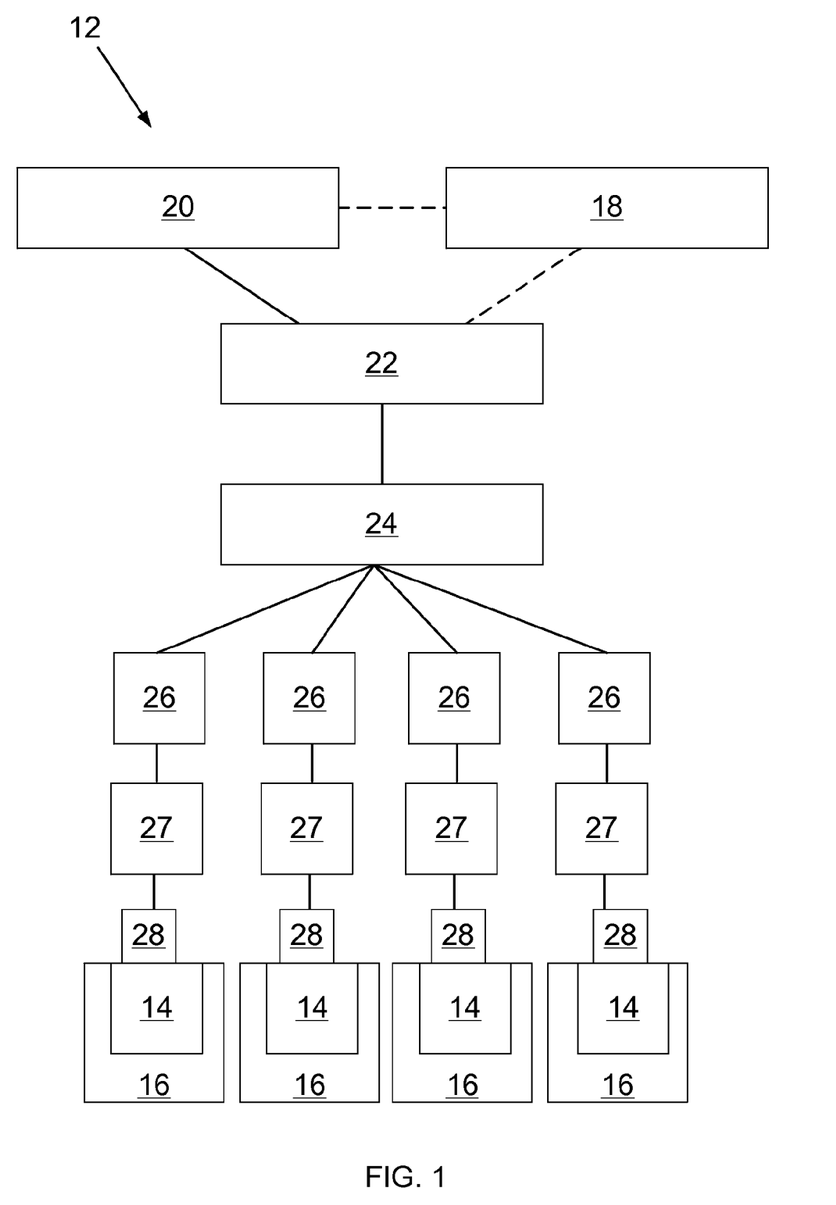
FIG. 1 is a schematic view of a central tire inflation system including a valve assembly according to the present disclosure.
Figure 2:
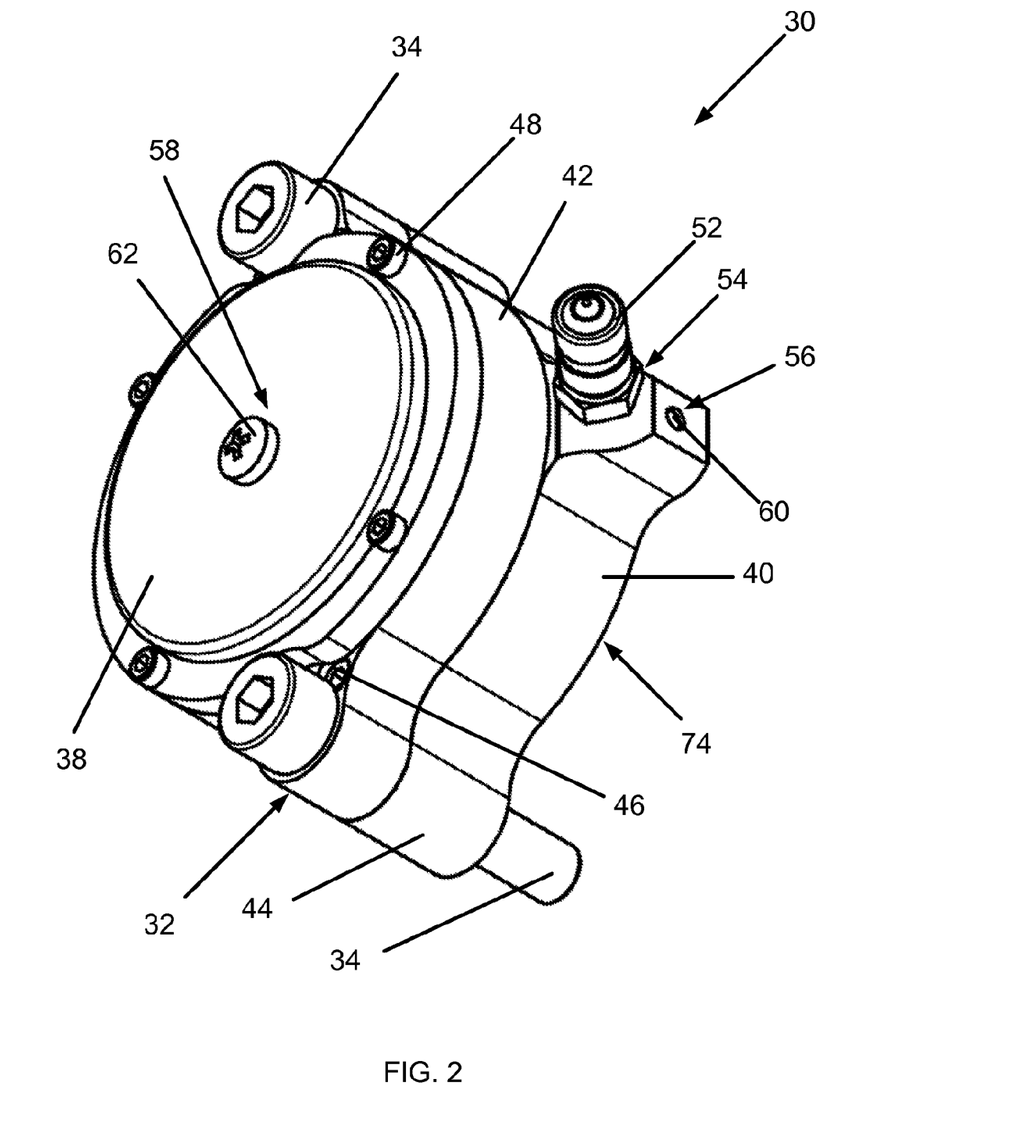
FIG. 2 is a top perspective view of valve assembly according to the present disclosure.
Figure 3:
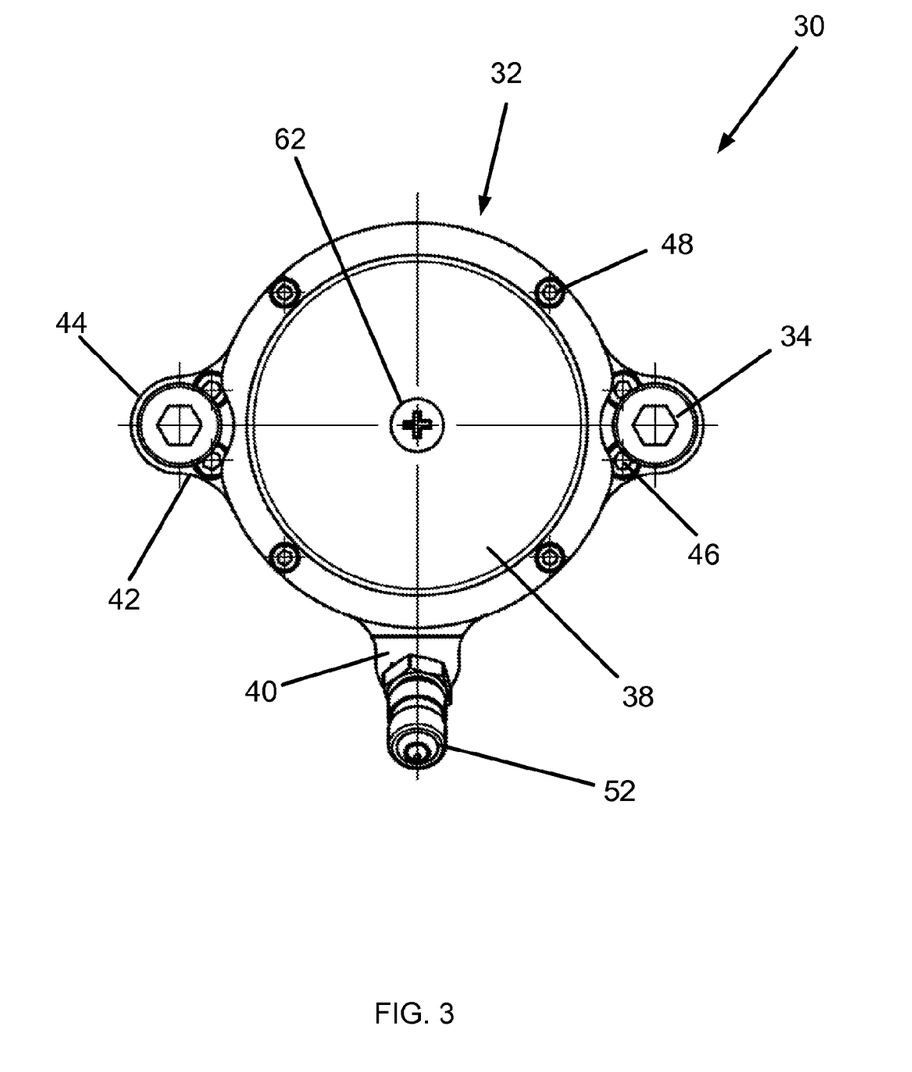
FIG. 3 is a top view of the valve assembly of FIG. 2.

Referring now in detail to the drawings, and initially to FIG. 1, a central tire inflation system (CTIS) is shown at 12. The CTIS 12 may be configured to function with a wheeled vehicle or with any other device including inflatable members. The CTIS 12 is configured to adjust pressure of any suitable number of inflatable members, such as tires 14 of wheels 16.

The CTIS 12 includes a control interface 18 providing manual and/or automatic adjustment of tire pressures of the tires 14. The control interface 18 may be accessed by a user or may include any suitable processor for automatically adjusting tire pressure of the tires 14. The control interface 18 is communicatively connected to a compressor 20 for providing air to the tires 14.

A pneumatic control unit 22 is responsive to the control interface 18 and is communicatively connected to the compressor 20 and a system of main air transfer passages 24, such as being connected between the compressor 20 and the system of main air transfer passages 24 as depicted. The pneumatic control unit 22 may include a port for venting to atmosphere. The main air transfer passages 24 may be separate from and connected to the vehicle, or alternatively they may be formed integral with the vehicle, such as being formed within a vehicle frame.

Rotary unions 26 communicatively connect wheel air transfer passages 27 to the main air transfer passages 24 in the remainder of the vehicle. The wheel air transfer passages 27 may be connected to and/or formed in the wheels 16. A control valve assembly 28 according to the present disclosure is disposed at each wheel 16 to provide control of deflation and/or inflation of each respective tire 14.

In other embodiments, the components of the CTIS 12 may be arranged in any other suitable order of connection.

Turning now to FIGS. 2-6, a pressure and temperature compensated control valve assembly according to the present disclosure is shown at 30. The valve assembly 30 may be used in place of a valve assembly 28 of the CTIS 12 of FIG. 1. The valve assembly 30 includes a valve body 32 mounted to a wheel by fasteners 34 extending through the valve body 32. The fasteners 34 may be bolts, rivets, screws, etc. The valve assembly 30 may be flush mounted to a wheel or axle, and may not require fluid transfer members, such as hoses, disposed between the valve assembly 30 and the wheel and/or axle. In some embodiments the valve assembly 30 may be mounted to another suitable location of the respective vehicle and may be fluidly connected to the wheel and/or axle via fluid transfer members, such as hoses. In this way, the valve assembly 30 may include ports opening directly to a tire, and may not include ports for connecting to air lines to route inflation and deflation pressure between the valve assembly 30 and the wheel and/or tire. In one embodiment the valve assembly 30 may be attached to the wheel by welding, adhesives, etc.

The valve body 32 includes an upper body portion 38, also herein referred to as a cover 38, a lower body portion 40, and an intermediate body portion 42 disposed between the cover 38 and the lower body portion 40. The lower and intermediate body portions 40 and 42 may be positioned with respect to one another via the fasteners 34 extending through radially outwardly extending attachment portions 44 of each of the lower and intermediate body portions 40 and 42. The attachment portions 44 may or may not include threading for mating with threading of the fasteners 34. In other embodiments, the fasteners 34 may not position the body portions 40 and 42 with respect to one another.

Fasteners 46 are also included for attaching the portions 40 and 42. The fasteners 46 may be bolts, rivets, screws, etc. The upper body portion 38 is attached to the intermediate body portion 42 by additional fasteners 48, extending at least partially through the intermediate body portion 42. The additional fasteners 48 may be bolts, rivets, screws, etc.

In other embodiments, the portions 38, 40 and 42 may be additionally or alternatively attached to one another via welding, adhesives, etc. Each of the portions 38, 40, and 42 may be made of any suitable material, such as metallic material or generally rigid plastic.

The valve body 32 includes numerous ports extending through at least one of the portions 38, 40 and 42. An external access valve 52, such as a tank valve, is received in a manual fill port 54 extending through the lower body portion 40. As depicted, the manual fill port 54 is in communication, such as constant communication, with the tire. The external access valve 52 provides a location for manual adjustment of tire pressure of the tire as an alternative to automatic adjustment via a respective pneumatic control unit. The valve 52 also enables a location for verifying tire pressure as an alternative to data which may be output by the pneumatic control unit to a respective control interface.

Other ports include an auxiliary access port 56 and a vent port 58. The access port 56 may be provided during manufacturing for cross-connecting the manual fill port 54 with a port directly connected to the tire. A seal, such as a bearing 60, is pressed into the access port 56 to seal the access port 56 after manufacturing. Alternatively, the access port 56 may be sealed by any other suitable plug, may be welded shut, etc. The vent port 58 is provided to prevent a pressure pre-load from being applied to internal valve components during manufacture by allowing a location for pressure to escape. The vent port 58 is sealed via a vent screw 62. As shown, the vent port 58 extends through the cover 38, while the access port 56 and manual fill port 54 extend through the lower portion 40. In other embodiments the ports 56 and 58 may be suitably located elsewhere with respect to the valve body 32.

Figure 4:
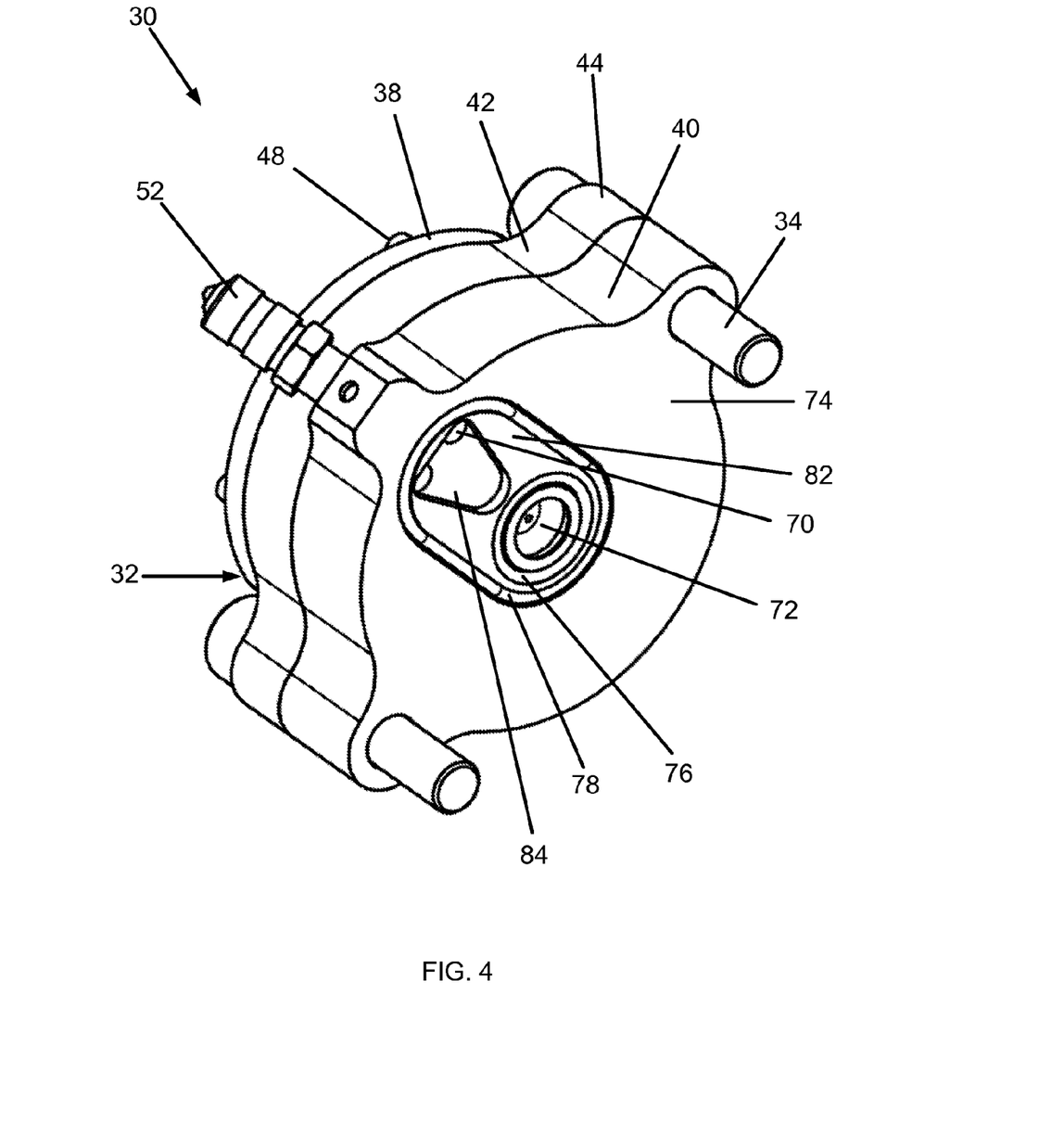
FIG. 4 is a bottom perspective view of the valve assembly of FIG. 2.
Figure 5:
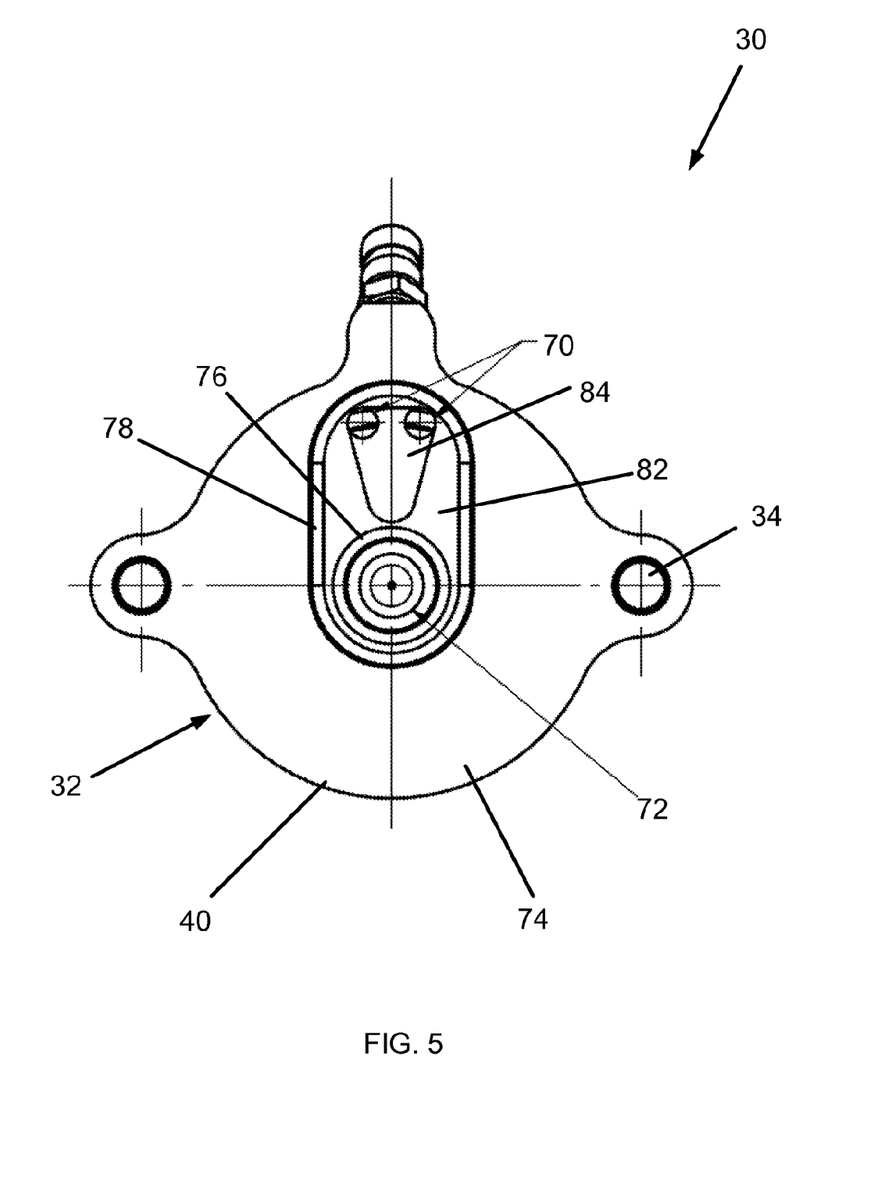
FIG. 5 is a bottom view of the valve assembly of FIG. 2.
Figure 6:
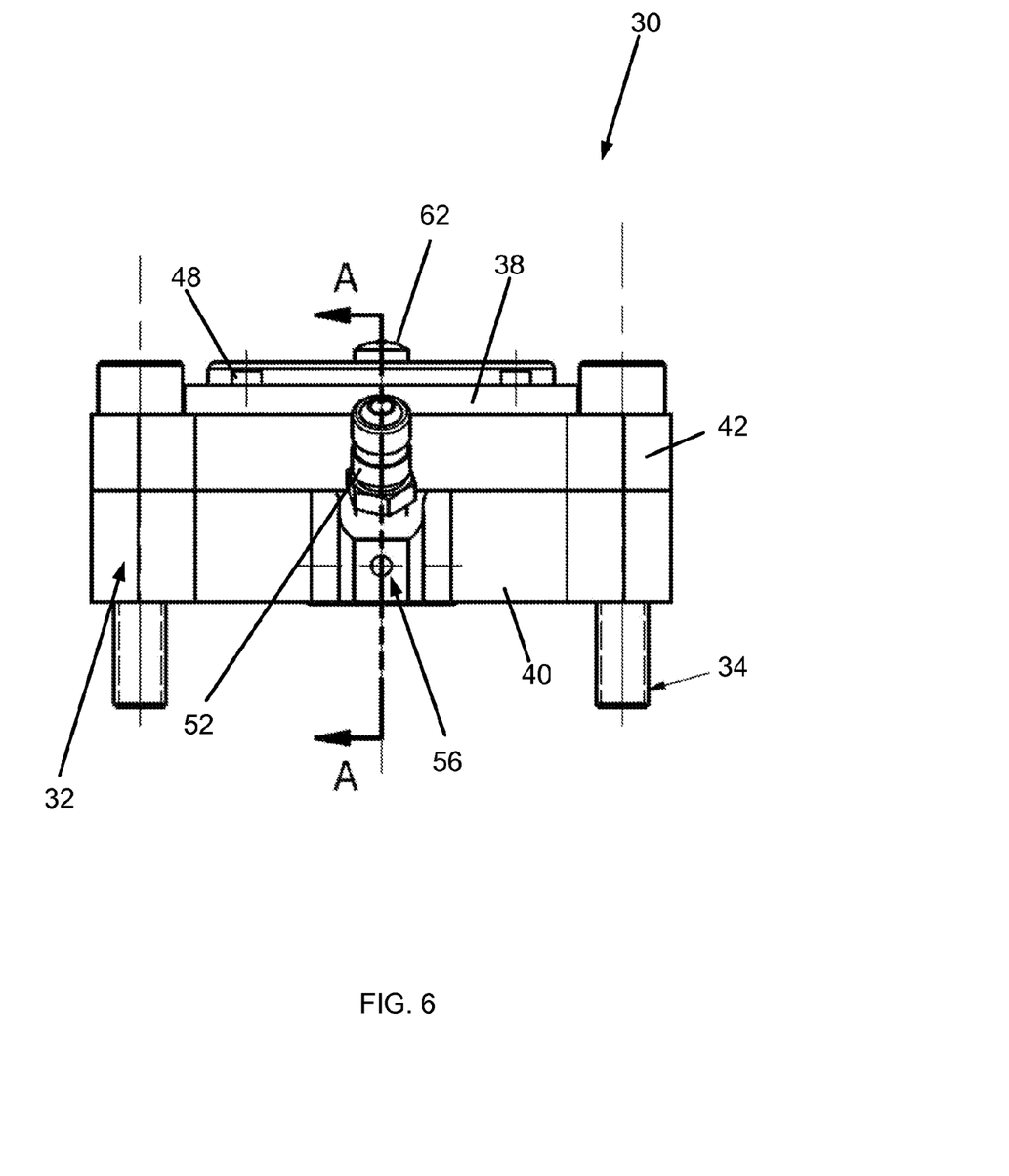
FIG. 6 is a side view of the valve assembly of FIG. 2.

Turning specifically to FIGS. 4 and 5, control ports 70 and a tire port 72 are disposed in a bottom surface 74 of the lower body portion 40. The bottom surface 74 is configured to at least partially mount to the wheel. The control ports 70 provide for fluid communication, such as gaseous communication, liquid communication, or a combination thereof, of the valve assembly 30 with a control source, such as a compressor, and/or with the remainder of a CTIS. The tire port 72 is positioned adjacent the control ports 70, although the ports 70 and 72 may be further separated in other embodiments. The tire port 72 provides for flow of fluid, such as liquid, gas, or a combination thereof, to and from a respective tire to which the valve assembly 30 is mounted. Two control ports 70 and one tire port 72 are depicted, though any suitable number, one or more, of control ports 70 and tire ports 72 may be utilized. Seals such as o-rings 76 and 78 are disposed about the ports 70 and 72 for enabling air-tight engagement between the valve assembly 30 and the respective wheel when the valve assembly 30 is flush mounted against the wheel in any suitable manner. The radially internal o-ring 76 is disposed about the tire port 72, while the radially external o-ring 78 is disposed about the radially internal o-ring 76, tire port 72, and control ports 70. The bottom surface 74 may include one or more recesses 82 for locating the o-rings 76 and 78. A connection recess 84 enables fluid communication between the control ports 70 and is enclosed by the radially external o-ring 78 once the valve assembly 30 is mounted to the wheel.

Figure 7:
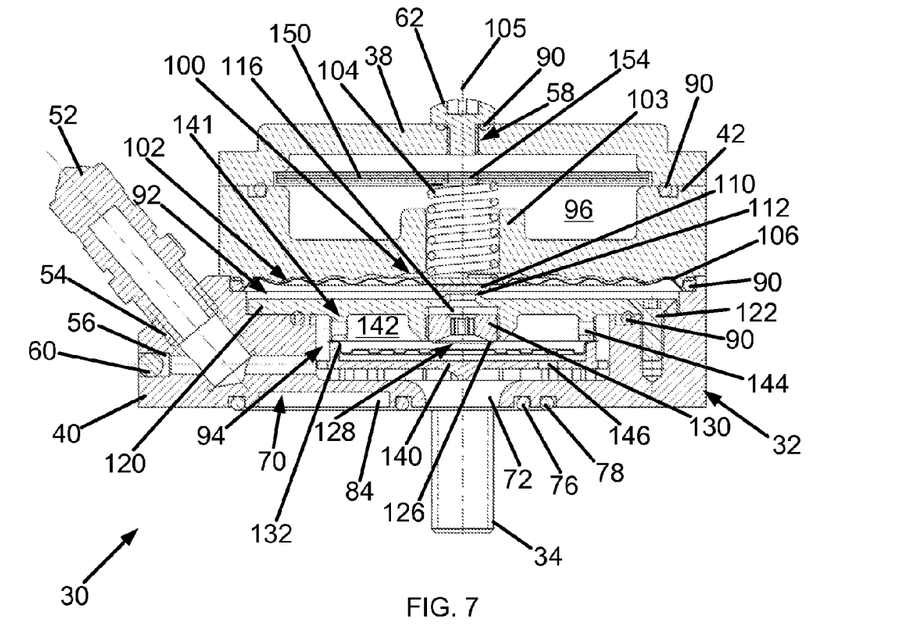
FIG. 7 is a cross-sectional view of the valve assembly of FIG. 6, taken through line A-A of FIG. 6.
Figure 8:
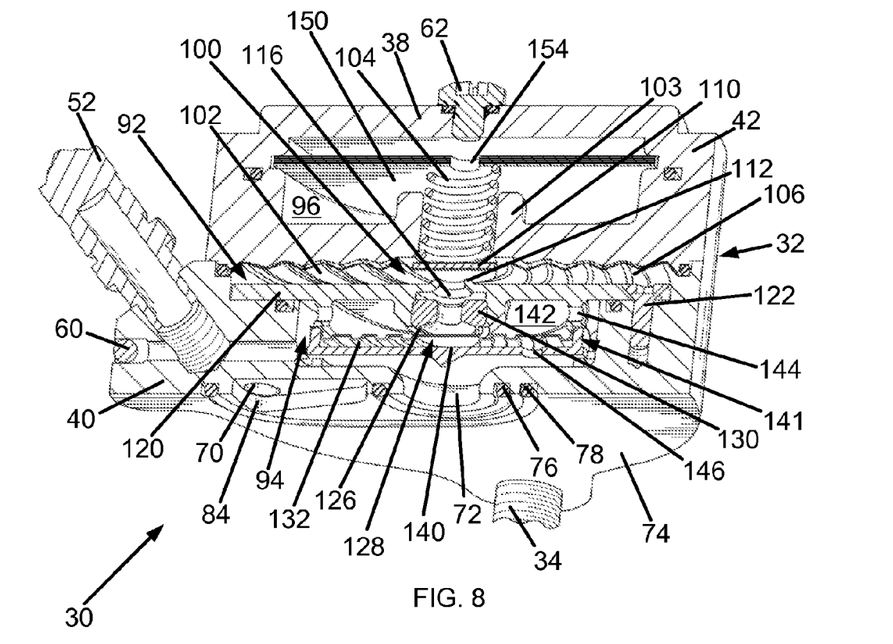
FIG. 8 is a perspective cross-sectional view of the valve assembly of FIG. 2.

Turning now to FIGS. 7 and 8, the valve assembly 30 is shown in cross-sectional views. As previously stated, the manual fill port 54 is fluidly connected to the tire port 72. The external access valve 52 provides one option for control of flow between the tire port 72 and the external environment through the manual fill port 54. Another option is to vent the tire through the control port 70 and into the remainder of the respective CTIS.

The portions 38, 40, and 42 and vent screw 62 are shown disposed adjacent one another, with seals 90 disposed therebetween for providing an air-tight valve assembly 30. Defined by the portions 38, 40 and 42 are three functional chambers 92, 94, and 96 disposed between the tire port 72 and the control ports 70. The functional chambers 92, 94 and 96 contain numerous internal components of the valve assembly 30. The chambers 92, 94 and 96 may be formed in any suitable portion of the valve body 32, and any of the valve body portions 38, 40, and 42 may be formed integral with one another.

The chamber 92 is a flow chamber 92, containing a flow valve 100 for controlling flow between the tire port 72 and the control ports 70. In response to pressure in the flow chamber 92, the flow valve 100 moves between a flow open position, to allow fluid to move into the tire for inflation and out of the tire for deflation, and a flow closed position, to stop flow between the tire port 72 and control ports 70. The flow valve 100 includes a valve member 102 and a biasing member 104. The biasing member 104, such as a spring, biases the valve member 102, and thus the flow valve 100, in the flow closed position, preventing flow between the tire port 72 and the control ports 70. A central portion 103 of the intermediate body portion 42 radially supports the biasing member 104 during its axial compression along a longitudinal central axis 105 of the valve assembly 30 and relative to the valve member 102.

The valve member 102 includes a flow diaphragm 106 radially outwardly disposed with respect to a flow poppet 110. The flow diaphragm 106 is elastically deformable, such as elastically bendable, to move the flow poppet 110 towards and away from a flow valve seat 112, controlling flow through the flow valve 100. The flow diaphragm 106 and the flow poppet 110, and thus the valve member 102, are concentrically aligned with an orifice, such as a transition orifice 116, through the valve seat 112. The orifice 116 connects the chamber 92 to the tire port 72, and thus in the depicted embodiment the valve member 102 is concentrically aligned with the tire port 72, although the valve member 102 may be otherwise suitably aligned in other embodiments. As shown the flow diaphragm 106 may have convolutions or bends formed therein enabling it to deform and moving the flow valve 100 between the flow open and flow closed positions. In the flow open position, the poppet 110 is disengaged from the valve seat 112, and in the flow closed position, the poppet 110 is in contact with the valve seat 112.

The flow diaphragm 106 may be made of a metallic material, while the flow poppet 110 may be made of a polymer, such as an elastic polymer, enabling the poppet 110 to form a seal with the valve seat 112. Use of a metallic diaphragm provides the advantages of consistent reaction force (elasticity) that is substantially unaffected by temperature, chemicals, and aging or breakdown. The metallic diaphragm 106 is also substantially impermeable, thus preventing leaking into or out of a trapped volume of fluid, such as air, disposed against an upper surface of the metallic diaphragm and separated from flow between the tire port 72 and the control ports 70. In other embodiments, the flow diaphragm 106 and flow poppet 110 may each be made of any suitable material, such as a suitable rigid or elastically deformable plastic, etc.

While the flow chamber 92 is defined between the intermediate body portion 42 and the lower body portion 40, it is also defined between a lower surface of the flow diaphragm 106 and an upper surface of a body member 120, which includes the flow valve seat 112. The body member 120 is attached to the valve body 32, such as to the lower body portion 40, by one or more fasteners 122, which may be bolts, screws, etc. In one embodiment the body member 120 may be attached via welding, adhesives, etc.

Inflation flow may enter the flow chamber 92 via a control port 70, extending through the valve body 32. The inflation flow will thus enter the flow chamber 92 and impact upon the flow diaphragm 106. Flow, such as deflation flow, may also enter the flow chamber 92 from the chamber 94 and the tire port 72. In this manner, deflation flow will enter the flow chamber 92 through the body member 120 and the transition orifice 116 by moving past the flow valve seat 112 and between the flow valve seat 112 and the poppet 110.

Referring now to the chamber 94, a lower surface of the body member 120 defines at least a portion of the chamber 94, which is a regulation chamber 94. The regulation chamber 94 is also defined by the lower body portion 40. The flow chamber 92 and regulation chamber 94 are fluidly connected via the orifice 116, which extends between each of the flow chamber 92 and the regulation chamber 94. The regulation chamber 94 is thus interdisposed between the flow chamber 92 and the tire port 72 in the illustrated embodiment.

While a first end of the orifice 116 is at least partially defined by the flow valve seat 112, a second end of the orifice 116 is defined by a throttle valve seat 126 of a throttle valve 128, disposed in the regulation chamber 94. The throttle valve 128 provides for restriction of flow between the flow chamber 92 and the regulation chamber 94, and thus between the tire port 72 and the control ports 70, to be discussed further. Accordingly, a first side of the orifice 116 is engageable by the flow valve 100 to open and close the flow valve 100. A second side of the orifice 116 is disposed adjacent the throttle valve 128 to restrict flow through the orifice 116 upon throttling of the throttle valve 128 relative to the throttle valve seat 126/second side of the orifice 116.

A portion of the orifice 116 disposed between the flow valve seat 112 and the throttle valve seat 126 is defined by both the body member 120 and an adjustable insert 130. The adjustable insert 130 includes the throttle valve seat 126, although the throttle valve seat 126 and insert 130 may be separate components in other embodiments. The adjustable insert 130, and thus the throttle valve seat 126, is adjustably positionable with respect to a remainder of the throttle valve 128, thereby setting the flow rate at which the throttle valve 128 throttles. As shown, the adjustable insert 130 is received in and adjustable relative to the body member 120, such as along the central longitudinal axis 105. Each of the adjustable insert 130 and body member 120 may include corresponding threads for facilitating the adjustment of the flow rate through the throttle valve 128. Due to the adjustability of the throttle valve seat 126 positioning, the flow rate through the throttle valve 128 may be precisely calibrated and/or easily adjusted.

In addition to the throttle valve seat 126, the throttle valve 128 also includes a throttle diaphragm 132 for moving with respect to the throttle valve seat 126 to move the throttle valve 128 between a throttle open position and a throttle throttling position, thus throttling flow through the throttle valve 128 and the regulation chamber 94. The throttle diaphragm 132 is made of a metallic material, though other suitable materials may be used, such as a polymer, etc. As with the flow diaphragm 106, use of a metallic diaphragm 132 provides the advantages of consistent reaction force (elasticity) that is substantially unaffected by temperature, chemicals, and aging or breakdown. The metallic diaphragm 132 is also impermeable, thus preventing leaking into or out of the tire and/or into or out of a trapped volume of fluid, such as air, disposed in the chamber 96.

The throttle diaphragm 132 is concentrically aligned with respect to the tire port 72 and transition orifice 116, although the diaphragm 132 may be otherwise suitably aligned in other embodiments. The throttle diaphragm 132 is also radially inwardly spaced from the valve body 32 via engagement with a throttle body member 140, enabling flow about all sides of the throttle diaphragm 132. The throttle diaphragm 132 is radially outwardly constrained between portions of the body member 120 and the throttle body member 140, which form a throttle valve housing 141 for at least partially enclosing the throttle diaphragm 132. The throttle valve housing 141 defines therein a diaphragm cavity 142 at least partially containing the throttle diaphragm.

The throttle body member 140 is seated in the regulation chamber 94 between the valve body 32 and the body member 120. As shown, the throttle body member 140 is spaced between the tire port 72 and the orifice 116. The throttle body member 140 is shaped to receive flow from the tire port 72, which impacts the throttle body member 140 prior to impacting upon the throttle diaphragm 132.

The throttle diaphragm 132 is positioned in the path of flow between the tire port 72 and the control ports 70, such that opposite sides of the throttle diaphragm 132 are each in communication with pressure in the regulation chamber 94. A first side of the throttle diaphragm 132 is positioned in the path of flow from the tire port 72. A second side opposite the first side is positioned in the path of flow through the orifice 116 from the flow chamber 92.

Both sides of the throttle diaphragm 132, and also the diaphragm cavity 142, are in fluid communication with a radially outward portion of the regulation chamber 94 disposed about the throttle valve housing 141, which includes the throttle body member 140. The second side of the throttle diaphragm 132 is in communication with the radially outward portion of the regulation chamber 94 via at least one restriction aperture 144 extending through the body member 120, and thus through the throttle valve housing 141. The first side of the throttle diaphragm 132 is in communication with the radially outward portion of the regulation chamber 94 via a fluid port, such as a static fluid port 146, extending through the body member 140, and thus through the throttle valve housing 141. Though the illustrated embodiment includes one static fluid port 146 and two restriction apertures 144, any suitable number of fluid ports 146 and restriction apertures 144, one or more of each, may be included. In other embodiments suitable construction of the throttle valve 128 may include second restriction apertures 144 extending instead through the throttle body member 140 and in communication with the second side of the throttle diaphragm 132.

Absent flow through the regulation chamber 94/throttle valve 128, or upon relatively low flow through the regulation chamber 94/throttle valve 128, equal pressures affect the opposite sides of throttle diaphragm 132. Because the opposite sides of the throttle diaphragm 132 are each in communication with pressure in the regulation chamber 94, the throttle diaphragm 132 is normally biased in the throttle open position caused by the pressure balance across the diaphragm 132. In the throttle open position a radially inward portion of the throttle diaphragm 132 is spaced from body member 120 and from the throttle body member 140. Due to this pressure compensation across the throttle diaphragm 132, the illustrated embodiment of the throttle valve 128 does not include additional biasing members affecting the throttle diaphragm 132. Rather, the throttle diaphragm 132 is disengaged from any biasing member such that it is separated from contact with any biasing member.

Flow received through the regulation chamber 94/throttle valve 128 and from the tire port 72, such as high deflation flow, causes a pressure differential across the throttle diaphragm 132 causing it to first move toward the throttle throttling position. In the throttle throttling position, the throttle diaphragm 132 is spaced nearer the throttle valve seat 126 as compared to spacing between the throttle diaphragm 132 and the throttle valve seat 126 when the throttle valve is in the throttle open position. Continued flow causes the throttle diaphragm 132 to throttle between the throttle open and throttle throttling positions. The flow rate through the throttle valve 128 is at least partially controlled via positioning of the adjustable insert 130 relative to the normally open position of the throttle diaphragm 132.

Particularly, deflation flow received from the tire port 72 first impacts the throttle body member 140 and then moves about the valve housing 141. The flow enters the diaphragm cavity 142 via the plurality of restriction apertures 144, and then flows into the flow chamber 92 via the transition orifice 116. The flow through the relatively small cross-section of the restriction apertures 144 and into the portion of the diaphragm cavity adjacent the second side of the throttle diaphragm 132 causes a pressure drop on the second side of the throttle diaphragm 132. The pressure drop on the second side of the throttle diaphragm 132 as compared to a pressure on the first side of the throttle diaphragm 132 adjacent the tire port 72 causes a pressure differential across the throttle diaphragm 132. The greater the deflation flow from the tire port 72 through the restriction apertures 144, the greater the pressure differential. Thus the throttle diaphragm 132 is caused to move towards the throttle valve seat 126, throttling flow through the throttle valve seat 126, where increased throttling is caused in the case of increased deflation flow from the tire port 72. On the other hand, flow received from the flow chamber 92, such as inflation flow, moves through the transition orifice 116 and adjustable insert 130, past the throttle valve seat 126, and impacts upon the second side of the throttle diaphragm 132. The flow then moves through the restriction apertures 144 in the body member 120 and into the portion of the regulation chamber 94 disposed about the throttle body member 140. Flow then moves about the throttle body member 140 and out through the tire port 72. In this way, the throttle diaphragm 132 is not caused to move towards the throttle valve seat 126, the throttle valve 128 is not throttled, and thus inflation flow from the flow chamber 92/control ports 70 is not impeded by the throttle diaphragm 132 or the throttle valve 128.

In use, the construction of the valve assembly 30, including the flow valve 100 and throttle valve 128, provide for efficient inflation and controlled deflation. To inflate the tire, an initial/reference pressure signal is directed through the control ports 70 and into the flow chamber 92. The reference pressure signal opens the presently closed flow valve 100 by overcoming the combined reaction forces of the biasing member 104, flow diaphragm 106 and poppet 110. Pressure in the flow chamber 92 causes the flow diaphragm 106 to be moved away, such as vertically away, from the control ports 70 causing the flow poppet 110 to disengage from contact with the valve seat 112. Additional pressure from the respective compressor greater than the current tire pressure maintains flow in a direction from the control ports 70 to the tire port 72, thus inflating the tire.

To deflate the tire, an initial/reference pressure is again directed through the control ports 70 to open the presently closed flow valve 100 by overcoming the forces of the biasing member 104, diaphragm 106, and poppet 110. However, additional pressure and flow is not supplied through the control ports 70. Instead, when tire pressure is greater than the externally applied reference pressure, tire pressure is allowed to flow from the tire port 72 and to exit out the control ports 70.

During this deflation, the throttle valve 128 controls the rate of deflation via pressure compensated flow control by creating a differential pressure proportional to flow through the valve assembly 30 and independent of tire pressure of the tire. The flow through the restriction apertures 144 effects a pressure differential across the throttle diaphragm 132, causing the throttle diaphragm 132 to deflect from its normally open position towards a throttling position nearer or in contact with the throttle valve seat 126. As flow continues from the tire through the tire port 72 and into the regulation chamber 94, the throttle diaphragm 132 is caused to throttle between the open and throttling positions, restricting flow through the throttle valve 128.

The resulting restriction in flow controls the flow rate flowing through the open flow valve 100, out the control ports 70, and into the system of respective air transfer passages. The pressure compensation enables the flow valve 100 to shut off without being unwantedly maintained in the flow open position by continued flow from the tire port 72. The pressure compensation also negates a back pressure from building up in the respective air transfer passages, which might also cause the flow valve 100 to be unwantedly maintained in the flow open position.

The flow is additionally restricted from the regulation chamber 94 to the flow chamber 92 because the restriction apertures 144 have an effective area less than the transition orifice 116. The combined effective flow area of this plurality of apertures 144 is configured to meet desired deflation rates of the respective CTIS at reduced tire pressures. Increasing flow from the tire results in a pressure differential which moves the throttle diaphragm 132 towards the throttle valve seat 126. The throttle diaphragm 132 will throttle at high flow (high pressure differential) due to the deflection toward the adjustable insert 130 and throttle valve seat 126.

For shut off of the valve assembly 30 upon completion of deflation or inflation, pressure is removed externally from the control ports 70. Pressure drops across the valve seat 112. Reduced flow through the throttle valve 128 results from the pressure compensating flow control of the throttle diaphragm 132 and flow through the restriction apertures 144 of the throttle valve housing 141 from the tire port 72. The pressure compensation enables the flow valve 100 to close preventing continued flow through the flow valve seat 112, and thus through the transition orifice 116.

This shut off function is enabled both at low and high tire pressures. The cross-sectional flow area of the transition orifice 116 through the flow valve seat 112 is configured to meet desired deflate times at comparatively lower tire pressures. Additionally, the pressure compensation features of the throttle valve 128 (throttle diaphragm 132 and apertures 144 through the throttle valve housing 141) control the deflate flow rate at comparatively higher tire pressures, allowing the flow valve member 102 to engage the flow valve seat 112 during tire deflation at the comparatively higher tire pressures. Consequently, the closing force of the flow valve 100, and thus of the valve assembly 30, is determined substantially by the resulting back pressure in the system at the maximum flow setting, regardless of the maximum operating tire pressure.

The use of the restriction apertures 144 and the throttle diaphragm 132 negate the need for spring-biasing the throttle valve 128, thus providing a repeatable and consistent pressure compensated flow control performance as observed between a plurality of valve assemblies 30. Additionally, the pressure compensation features do not require elastomers or internal seals which may result in drag and/or hysteresis of the throttle valve 128. Thus the valve assembly 30 provides a precise and well-balanced flow rate through the valve assembly 30.

The pressure compensation features provide for low sensitivity to variations in wheel end flow, large tire pressure range (both minimum and maximum), and rapid desired deflation rates at lower tire pressures. A respective pressure control unit, controlling pressure into the valve assembly 30 through the control ports 70, is not required to provide varied deflation reference pressures correlating to the present tire pressure, thereby adding to the utility, durability, reliability, and repeatability of performance of the valve assembly 30 in a central tire inflation system.

In addition to the pressure compensation feature of the throttle valve 128, the depicted embodiment includes a temperature compensation feature, such as a temperature responsive member 150. In other embodiments, the temperature compensation feature may be included in a valve assembly 30 that does not include the pressure compensation features and/or the pressure compensation features may be included in a valve assembly 30 that does not include the temperature compensation feature.

The temperature responsive member 150 engages the biasing member 104 and is configured to deform in response to change in temperature. The deformation of the temperature responsive member 150 enables the valve assembly 30 to compensate for changes in pressure within the biasing member chamber 96 and flow chamber 92 due to changes in temperature. Accordingly, the temperature responsive member 150 negates temperature effects on the flow valve 100, allowing the flow valve 100 to close at a substantially consistent force across a range of operating temperatures.

The cover 38 and the intermediate body portion 42 constrain, such as radially outwardly constrain, the temperature responsive member 150 within the chamber 96. The chamber 96 is a biasing member chamber 96. A disc aperture 154 extends through the temperature responsive member 150, such as centrally through the temperature responsive member 150 along the central longitudinal axis 105. The disc aperture 154 allows pressure equalization across the temperature responsive member 150 by enabling equal pressures to affect opposite sides of the temperature responsive member 150. Other embodiments may additionally or alternatively include other apertures located at any suitable location of the member 150 and extending through the member 150.

As depicted the temperature responsive member 150 may be made of longitudinally stacked disks disposed adjacent one another. The disks may be composed of one or more metallic materials and may be stacked in any suitable order providing for necessary deformation of the member 150. In other embodiments any suitable number of disks, one or more, may be used, and the disks may be made of any suitable materials. The disks may be held adjacent one another via compression between the body portions 38 and 42, welding, adhesives, etc.

The biasing member chamber 96, and thus the temperature responsive member 150, is separated from flow between the control ports 70 and the tire port 72. An upper portion of the biasing member chamber 96 is disposed between the cover 38 and the intermediate body portion 42. The upper portion also extends through the central portion 103 of intermediate body portion 42 supporting the biasing member 104 of the flow valve 100. A lower portion of the chamber 96 is disposed between a lower surface of the intermediate body portion 42 (adjacent the flow diaphragm 106) and the flow diaphragm 106.

As depicted, the biasing member chamber 96 is air-tight, such as hermetically sealed, and thus contains a trapped volume of fluid, such as air. The fluid in the trapped volume is responsive to the varying temperatures to which the valve assembly 30 may be subjected, such as sub-freezing temperatures and/or conversely hot temperatures. The temperature responsive member 150 is subjected to the same fluctuation of temperature as the biasing member chamber 96.

In use, the temperature responsive member 150 is generally flat or non-deflected in a normal state at intermediate temperatures. The temperature responsive member 150 is configured to deflect or deform towards the biasing member 104 in response to relatively cold temperatures. Movement of the temperature responsive member 150 causes the biasing member 104 to be, additionally compressed, increasing a force on the valve member 102, and countering a pressure decrease in the biasing member chamber 96. For example, pressure decreases in the lower portion of the biasing member chamber 96 disposed adjacent the valve member 102 due to contraction of fluid within the biasing member chamber 96 from the relatively cold temperatures. Conversely, the temperature responsive member 150 is also configured to deflect or deform away from the biasing member 104 in response to relatively hot temperatures. Movement of the temperature responsive member 150 causes the length of the biasing member 104 to be elongated, reducing a force on the valve member 102, and countering a pressure increase in the biasing member chamber 96. For example, pressure increases in the lower portion of the biasing member chamber 96 disposed adjacent the valve member 102 due to expansion of fluid within the biasing member chamber from the relatively hot temperatures. Accordingly, temperature compensation of the valve assembly 30 is provided by the temperature responsive member 150, allowing the flow valve 100 to open at a substantially consistent force across a range of operating temperatures.

Trapped fluid volumes within the valve assembly 30 need not be vented to atmosphere to address the change in internal pressures in the biasing member chamber 96 affecting the flow diaphragm 106. By maintaining closure of the valve assembly 30 with respect to an external environment, contaminants and moisture are not introduced into the valve assembly 30, thus prolonging operating life and increasing operating performance of the valve assembly 30. Additionally, a respective pressure control unit, controlling pressure into the valve assembly 30 through the control ports 70, is not required to provide varied deflation reference pressures corresponding to the present pressures in the biasing member chamber 96, thereby adding to the durability, reliability, and repeatability of performance of the valve assembly 30. Therefore, inclusion of the temperature responsive member 150 in the valve assembly 30 may extend the operating range and life of the valve assembly 30.

In summary, a pressure and temperature compensated valve assembly 30 includes a flow valve 100 allowing inflation flow from a control port 70 to a tire port 72 and controlling deflation flow from the tire port 72 to the control port 70. A throttle valve 128 restricts deflation flow between the tire port 72 and the control port 70 when deflating the tire at high flow rates or when tire pressure is high, thus enabling the flow valve 100 to be closed. The throttle valve 128 includes a throttle diaphragm 132 that throttles in response to flow from the tire port 72 and which does not restrict inflation flow from the control port 72. The valve assembly 30 further includes a temperature responsive member 150 engaging the flow valve 100, and which deforms in response to a change in temperature in the valve assembly 30, thus negating temperature effects on the flow valve 100, allowing the flow valve 100 to close at a consistent force across a range of operating temperatures.

Although the aspects of the present disclosure have been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A method of adjusting tire pressure of a tire, the method comprising the steps of:
   controlling inflation and deflation flow between a source and the tire via a flow valve;
   restricting deflation flow between the source and the tire via a throttle valve; and
   moving air about opposite sides of a throttle diaphragm of the throttle valve to throttle the throttle valve, wherein the throttle diaphragm is separated from contact with any biasing member.

2. The method of claim 1, further including the step of adjusting a force of a biasing member acting on the flow valve via deformation of a temperature responsive member engaging the biasing member.

3. The method of claim 1, further including the step of adjustably positioning a throttle valve seat of the throttle valve with respect to the throttle diaphragm of the throttle valve, thereby setting the flow rate at which the throttle valve throttles.

4. A control valve assembly comprising:
   a valve body having a control port and a tire port, the valve body defining a flow chamber and a regulation chamber disposed between the control port and the tire port;
   a flow valve disposed in the flow chamber to control flow between the flow chamber and the regulation chamber, the flow valve being biased in a flow closed position and movable between the flow closed position and a flow open position in response to pressure in the flow chamber; and
   a throttle valve disposed in the regulation chamber to restrict flow from the regulation chamber to the flow chamber, the throttle valve including a throttle valve seat and a throttle diaphragm for moving with respect to the throttle valve seat;
   wherein the throttle valve is movable between a throttle open position of the throttle valve, where the throttle diaphragm is spaced a distance from the throttle valve seat, and a throttle throttling position of the throttle valve, where the throttle diaphragm is spaced nearer the throttle valve seat than in the throttle open position, wherein the throttle diaphragm has opposite sides each in communication with pressure in the regulation chamber (94), and wherein flow through the regulation chamber effects a pressure differential across the throttle diaphragm causing the throttle diaphragm to move between the throttle open and throttle throttling positions.

5. The control valve assembly of claim 4, wherein the opposite sides of throttle diaphragm include a first side positioned in the path of flow from the tire port and a second side positioned in the path of flow from the flow chamber.

6. The control valve assembly of claim 4, wherein the throttle diaphragm is disengaged from any biasing member in both the throttle open and throttle throttling positions of the throttle valve.

7. The control valve assembly of claim 4, wherein absent flow through the regulation chamber, the throttle diaphragm is in the throttle open position via equal pressures acting on opposite sides of the throttle diaphragm.

8. The control valve assembly of claim 4, wherein the throttle diaphragm is made of a metallic material.

9. The control valve assembly of claim 4, wherein the throttle valve seat is adjustably positionable with respect to the throttle diaphragm, thereby setting the flow rate at which the throttle valve throttles.

10. The control valve assembly of claim 4, wherein the throttle diaphragm is radially inwardly spaced from the valve body, thereby allowing flow through the regulation chamber to flow about all sides of the throttle diaphragm.

11. The control valve assembly of claim 4, wherein the valve body further defines a biasing member chamber, and further includes a temperature responsive member disposed in the biasing member chamber and engaging the flow valve, the temperature responsive member being deformable in response to change in temperature to counter a pressure affecting the flow valve, the pressure being caused by the change in temperature.

12. The control valve assembly of claim 11, wherein the temperature responsive member includes an aperture extending between opposite sides of the temperature responsive member, thereby allowing pressure equalization across the temperature responsive member.

13. The control valve assembly of claim 4, wherein the flow valve includes a flow diaphragm for controlling flow through the flow valve.

14. The control valve assembly of claim 13, wherein the flow diaphragm is made of a metallic material.

15. The control valve assembly of claim 4, further including an orifice extending between the flow chamber and the regulation chamber, wherein a first side of the orifice is engageable by the flow valve to open and close the flow valve, and wherein a second side of the orifice is disposed adjacent the throttle diaphragm to restrict flow from the regulation chamber to the flow chamber as the throttle diaphragm moves with respect to the second side of the orifice.

16. The control valve assembly of claim 15, wherein the throttle valve further includes a throttle valve housing at least partially enclosing the throttle diaphragm, wherein the throttle valve housing includes at least one aperture formed through the throttle valve housing, the at least one aperture extending between a first side open to the orifice and a second side open to the tire port, and wherein the at least one aperture has an effective area less than the orifice extending between the flow chamber and the regulation chamber.

17. A control valve assembly comprising:
a valve body including a control port and a tire port;
a flow valve disposed in the valve body for controlling flow between the control port and the tire port, the flow valve including a valve member and a biasing member for biasing the valve member in a closed position;
a throttle valve disposed in the valve body for restricting flow through the flow valve;
a transition orifice disposed in the valve body between the flow valve and the throttle valve, a first side of the transition orifice engageable by the flow valve, and a second side of the orifice disposed adjacent the throttle valve; and
a temperature responsive member disposed in the valve body and engaging the biasing member, the temperature responsive member being deformable in response to change in temperature to vary a pressure acting on the flow valve, the pressure being caused by the change in temperature.

18. The control valve assembly of claim 17, wherein the temperature responsive member includes an aperture extending between opposite sides of the temperature responsive member, thereby allowing pressure equalization across the temperature responsive member.

19. The control valve assembly of claim 17, wherein the temperature responsive member is deformable towards the biasing member in response to relatively cold temperatures, and wherein the temperature responsive member is deformable away from the biasing member in response to relatively hot temperatures.

20. The control valve assembly of claim 17, wherein the temperature responsive member is separated from flow between the control port and the tire port.

* * * * *